United States Patent
Kiyamura (10) Patent No.: US 7,759,896 B2
(45) Date of Patent: Jul. 20, 2010

(54) STEPPING MOTOR DRIVING DEVICE, LENS DRIVING DEVICE, AND CAMERA

(75) Inventor: Kousuke Kiyamura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 247 days.

(21) Appl. No.: 11/923,641

(22) Filed: Oct. 24, 2007

(65) Prior Publication Data
US 2008/0100253 A1 May 1, 2008

(30) Foreign Application Priority Data
Oct. 25, 2006 (JP) .............................. 2006-290067

(51) Int. Cl.
*G05B 19/40* (2006.01)
(52) U.S. Cl. ...................... 318/685; 318/696
(58) Field of Classification Search ................. 318/685, 318/696
See application file for complete search history.

(56) References Cited

U.S. PATENT DOCUMENTS

| | | | | |
|---|---|---|---|---|
| 5,384,506 A | * | 1/1995 | Aoshima | ................. 310/49.11 |
| 5,446,517 A | * | 8/1995 | Murakami et al. | .......... 396/133 |
| 5,977,739 A | * | 11/1999 | Ohsawa | ....................... 318/685 |
| 6,014,523 A | | 1/2000 | Oono et al. | |
| 6,642,687 B2 | * | 11/2003 | Aoshima | ..................... 318/696 |
| 7,068,006 B2 | * | 6/2006 | Nishimoto | ................... 318/685 |
| 2006/0108964 A1 | * | 5/2006 | Shibatani | ..................... 318/685 |

FOREIGN PATENT DOCUMENTS

| | | |
|---|---|---|
| JP | 05-203895 A | 8/1993 |
| JP | 10-197779 A | 7/1998 |
| JP | 10-313593 A | 11/1998 |
| JP | 2002-374697 A | 12/2002 |

\* cited by examiner

*Primary Examiner*—Rina I Duda
(74) *Attorney, Agent, or Firm*—Rossi, Kimms & McDowell LLP (57) ABSTRACT

A stepping motor driving device which makes it possible to reduce electric power consumed by a stepping motor and at the same time suppress degradation of shake correcting performance. A CPU of the stepping motor driving device switches between a first driving method in which a first applied voltage is applied to the stepping motor and a second driving method in which each pulse is divided to apply the first applied voltage over a predetermined time period and then apply a second applied voltage to the stepping motor, depending on the state of the drive frequency of the stepping motor.

8 Claims, 5 Drawing Sheets

M1: VOLTAGES APPLIED TO RESPECTIVE COILS OF FIRST STEPPING MOTOR
M2: VOLTAGES APPLIED TO RESPECTIVE COILS OF SECOND STEPPING MOTOR
W: TOTAL POWER CONSUMPTION

STEPPING MOTOR DRIVING DEVICE, LENS DRIVING DEVICE, AND CAMERA

BACKGROUND OF THE INVENTION

1. Field of the Invention

The present invention relates to a stepping motor driving device, a lens driving device, and a camera.

2. Description of the Related Art

Cameras manufactured today optically correct a shake, such as a camera shake caused by hand-held shooting, to thereby achieve shooting free from the shake. More specifically, such conventional cameras use means for driving a shake correcting lens in any direction orthogonal to an optical axis according to a signal from shake detecting means, such as a gyro sensor, to thereby prevent occurrence of image blur on an image forming surface.

Figure 5:
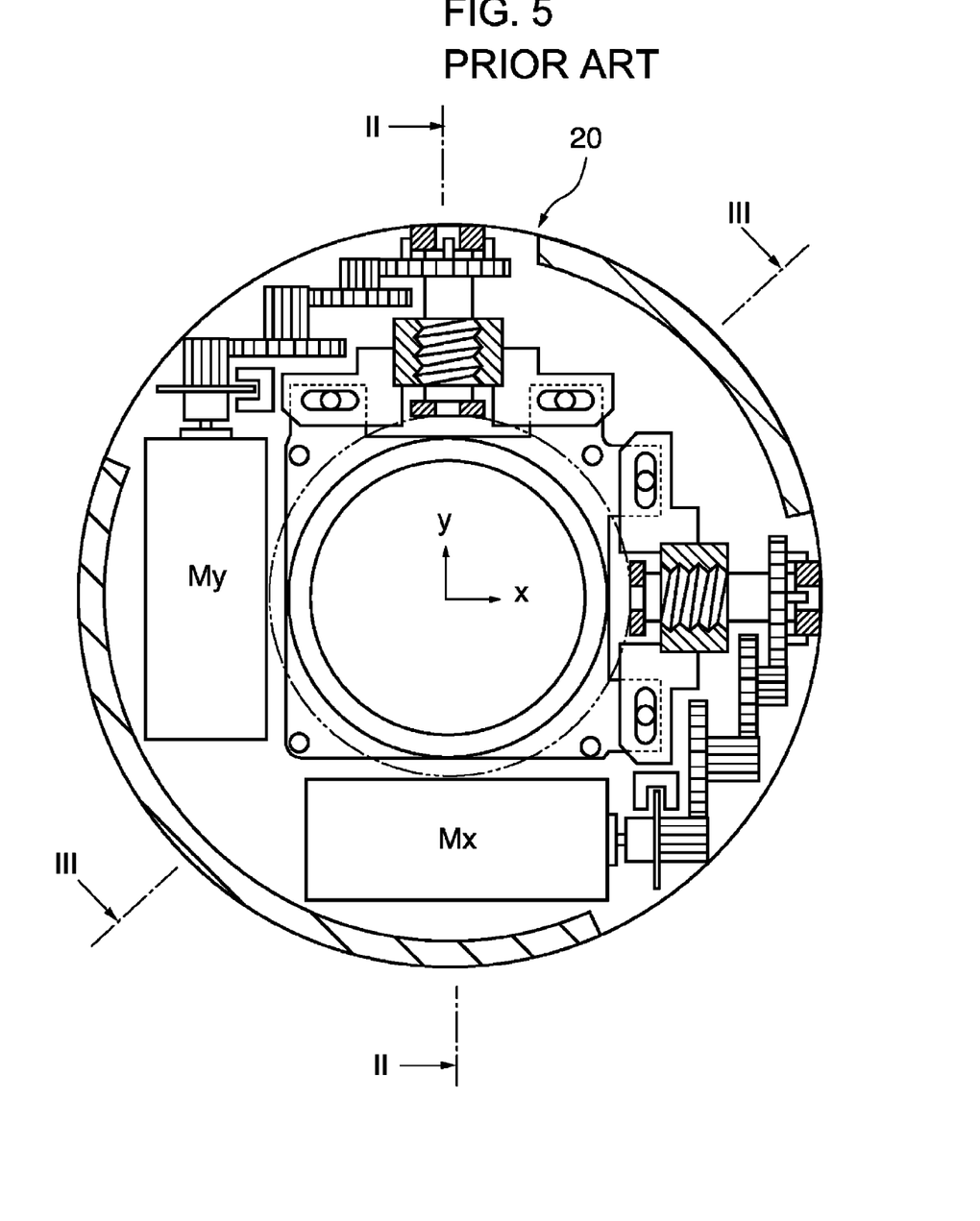
FIG. 5 is a front view of a conventional image blur preventing mechanism.

An image blur preventing mechanism 20 shown in FIG. 5 can be mentioned as a first prior art example related to the image blur preventing technique (see Japanese Laid-Open Patent Publication (Kokai) No. H05-203895).

According to this image blur preventing mechanism 20, the rotational angle of a first motor is controlled, for example, based on information on a shake detected by shake detecting means, whereby an output from the motor causes first conversion means to displace a shake correcting lens in a first direction for shake correction. Similarly, displacement of the shake correcting lens in a second direction is caused by a second motor.

Further, a time-sharing drive apparatus for a motor of a camera, which is disclosed in Japanese Laid-Open Patent Publication (Kokai) No. H10-197779 (corresponding to U.S. Pat. No. 6,014,523) can be mentioned as a second prior art example. This time-sharing driving apparatus is for a camera equipped with more than two motors, and includes motor driving control means for alternately driving the motors in a time-sharing manner.

With this configuration of the apparatus, it is possible to provide a time-sharing driving apparatus for a motor of a camera, which is reduced in power consumption, particularly in maximum power consumption.

Furthermore, a stepping motor driving device disclosed in Japanese Laid-Open Patent Publication (Kokai) No. H10-313593 can be mentioned as a third prior art example. This stepping motor driving device is configured to control a plurality of stepping motors based on data stored in advance. More specifically, the stepping motor driving device drives the stepping motors of a single-phase excitation type in a time sharing manner within a predetermined processing time period based on the data stored in advance.

With this configuration, it possible to reduce electric power consumed for driving the stepping motors simultaneously, without superposing exciting currents flowing through driving coils when using the stepping motors by driving them at a relatively low speed.

In each of the above second and third prior art examples, a description is basically given of a case where a plurality of stepping motors drive respective different lenses, such as a zoom lens for a zooming operation and a focus lens for a focusing operation. However, the apparatus or device can also be applied to the image blur preventing mechanism mentioned as the first prior art example, in which the single camera shake correcting lens is driven by the two stepping motors, so as to provide the same function.

In the image blur preventing mechanism in the first prior art example disclosed in Japanese Laid-Open Patent Publication (Kokai) No. H05-203895, it is required to always drive the shake correcting lens during execution of shake correction, and hence electric power is always consumed by the driving means, which causes an increase in the total power consumption of the camera.

Further, in still image shooting, in addition to shake correction required during an exposure operation so as to achieve shooting free from shakes, shake correction performed during an aiming operation which generally takes longer time than an exposure operation consumes the same amount of electric power, which causes an increase in power consumption in a single shooting operation.

Furthermore, in a camera which is capable of switching between still image shooting and moving image shooting, a larger amount of electric power is consumed in moving image shooting, where shake correction is always required, than in still image shooting.

What is more, the power consumption is constant during execution of shake correction, irrespective of shake speed. More specifically, in either of a case where the shake speed is high and the stepping motors are driven at a high speed and a case where the shake speed is low and the stepping motors are driven at a low speed, power consumption hardly changes, and hence unnecessary electric power is consumed when the stepping motors are driven at a low speed.

To eliminate these inconveniences, it is possible to reduce power consumption by using the motor driving apparatus or device shown in the prior art example 2 or 3. However, in the disclosed methods of driving motors in a time-sharing manner, time lag occurs between detection of a shake and the start of motor driving, which causes marked degradation of shake correcting performance.

SUMMARY OF THE INVENTION

The present invention provides a stepping motor driving device, a lens driving device, and a camera, which make it possible to reduce electric power consumed by a stepping motor and at the same time suppress degradation of shake correcting performance.

In a first aspect of the present invention, there is provided a stepping motor driving device comprising a stepping motor, and a control unit configured to switch between a first driving method in which a first applied voltage is applied to the stepping motor, and a second driving method in which each pulse is divided to apply the first applied voltage over a predetermined time period, and then apply a second applied voltage to the stepping motor, depending on a state of a drive frequency of the stepping motor.

In a second aspect of the present invention, there is provided a lens driving device comprising a lens which is movably supported, a stepping motor configured to drive the lens in a direction orthogonal to an optical axis, and a control unit configured to switch between a first driving method in which a first applied voltage is applied to the stepping motor, and a second driving method in which each pulse is divided to apply the first applied voltage over a predetermined time period, and then apply a second applied voltage to the stepping motor, depending on a state of a drive frequency of the stepping motor.

In a third aspect of the present invention, there is provided a camera comprising a release switch, a lens which is movably supported, a stepping motor configured to drive the lens in a direction orthogonal to an optical axis, and a control unit configured to switch between a first driving method in which a first applied voltage is applied to the stepping motor, and a second driving method in which each pulse is divided to apply the first applied voltage over a predetermined time period, and then apply a second applied voltage to the stepping motor, depending on a state of the release switch.

In a fourth aspect of the present invention, there is provided a camera comprising a switch having a function of switching between moving image shooting and still image shooting, a lens which is movably supported, a stepping motor configured to drive the lens in a direction orthogonal to an optical axis, and a control unit configured to switch between a first driving method in which a first applied voltage is applied to the stepping motor, and a second driving method in which each pulse is divided to apply the first applied voltage over a predetermined time period, and then apply a second applied voltage to the stepping motor, depending on a state of the switch.

The stepping motor driving device, the lens driving device, and the camera according to the present invention make it possible to reduce electric power consumed by the stepping motor and at the same time suppress degradation of shake correcting performance.

The features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
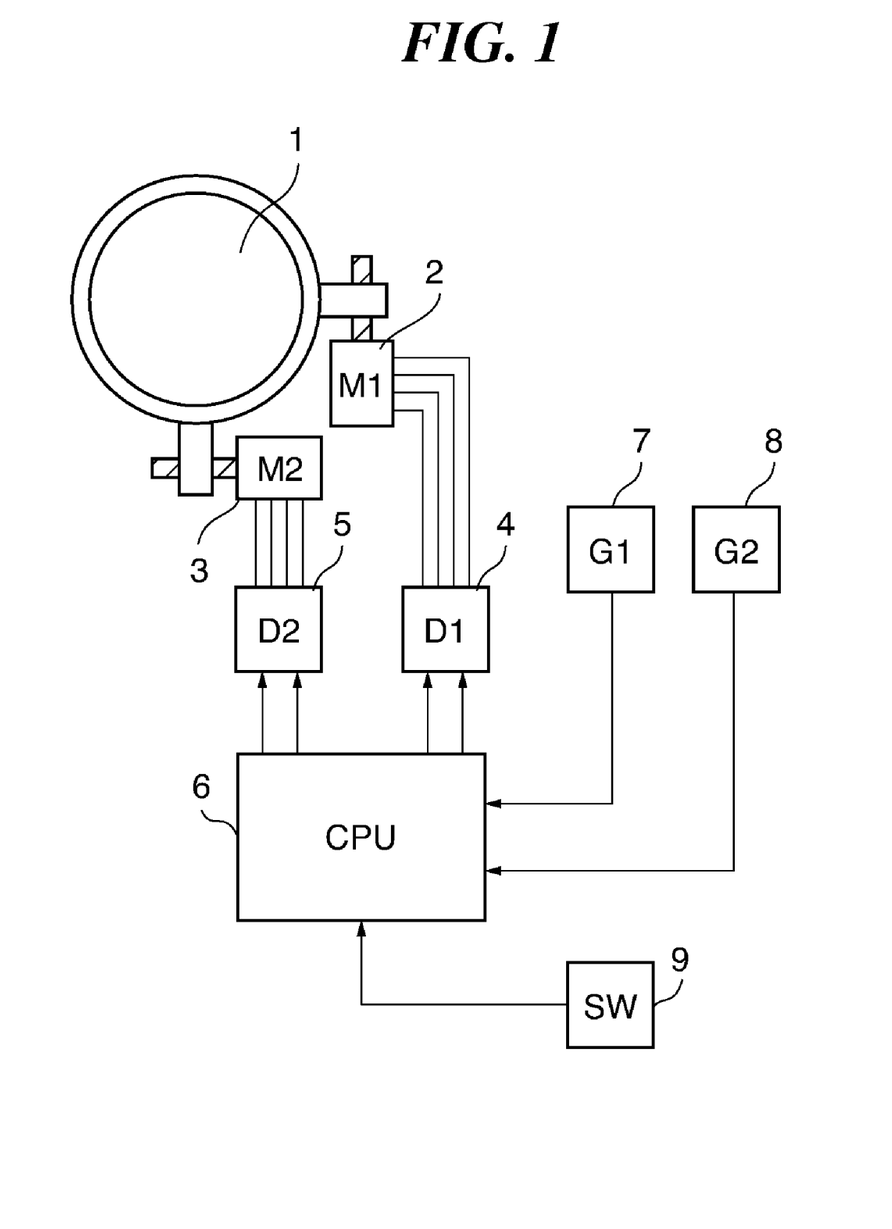
FIG. 1 is a block diagram of a camera according to an embodiment of the present invention.

FIG. 1 is a block diagram of a camera according to the embodiment of the present invention.

As shown in FIG. 1, a shake correcting lens 1 is disposed in a manner movable in any direction orthogonal to an optical axis. A first stepping motor 2 supports the shake correcting lens 1 such that the shake correcting lens 1 can be driven in a first direction. A second stepping motor 3 supports the shake correcting lens 1 such that the shake correcting lens 1 can be driven in a second direction.

A first driver 4 drives the first stepping motor 2 in accordance with drive pulses, described hereinafter, output from a CPU 6. A second driver 5 drives the second stepping motor 3 in accordance with drive pulses, described hereinafter, output from the CPU 6.

The CPU 6 delivers the drive pulses to the first driver 4 and the second driver 5 in response to respective shake signals output, respectively, from a first shake detecting unit 7, referred to hereinafter, and a second shake detecting unit 8, referred to hereinafter. Further, the CPU 6 is capable of controlling the first driver 4 and the second driver 5 such that the voltage applied to each of the first stepping motor 2 and the second stepping motor 3 is switched. Furthermore, the CPU 6 is capable of changing a method of switching the applied voltage according to the state of a release switch 9.

The first shake detecting unit 7 outputs to the CPU 6 a shake signal indicative of a sensed camera shake in the first direction. The second shake detecting unit 8 outputs to the CPU 6 a shake signal indicative of a sensed camera shake in the second direction.

When a camera shake occurs, a shake signal is output from the first shake detecting unit 7 and/or the second shake detecting unit 8, and the CPU 6 delivers drive pulses to the first driver 4 and/or the second driver 5 according to the shake signal output from the shake detecting unit(s).

The first driver 4 and/or the second driver 5 switches the voltage applied to each phase of the first stepping motor 2 and/or the second stepping motor 3 according to the drive signal, to cause rotation of the associated stepping motor(s). As a consequence, the shake correcting lens 1 is displaced in a direction orthogonal to the optical axis to correct the camera shake.

Figure 2A:
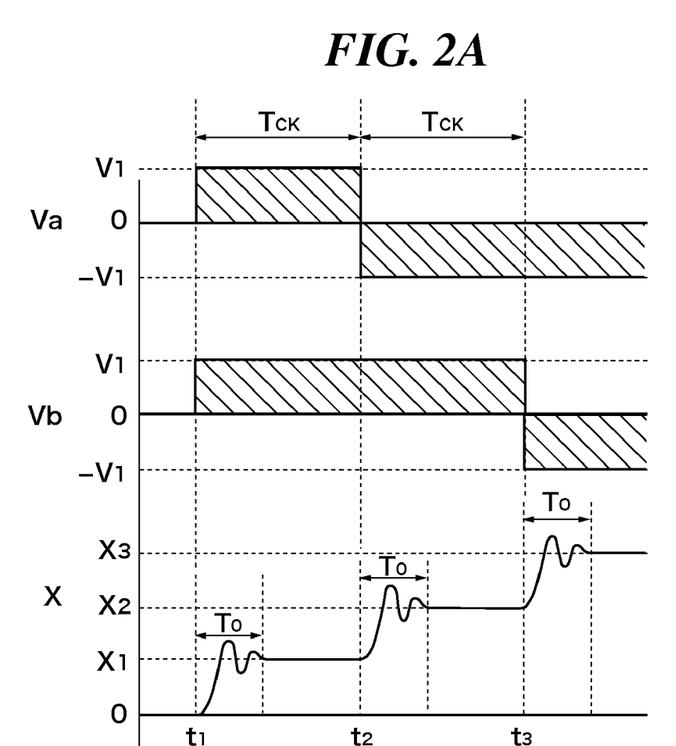
FIGS. 2A and 2B are diagrams useful in explaining methods of driving stepping motors appearing in FIG. 1.
Figure 2B:
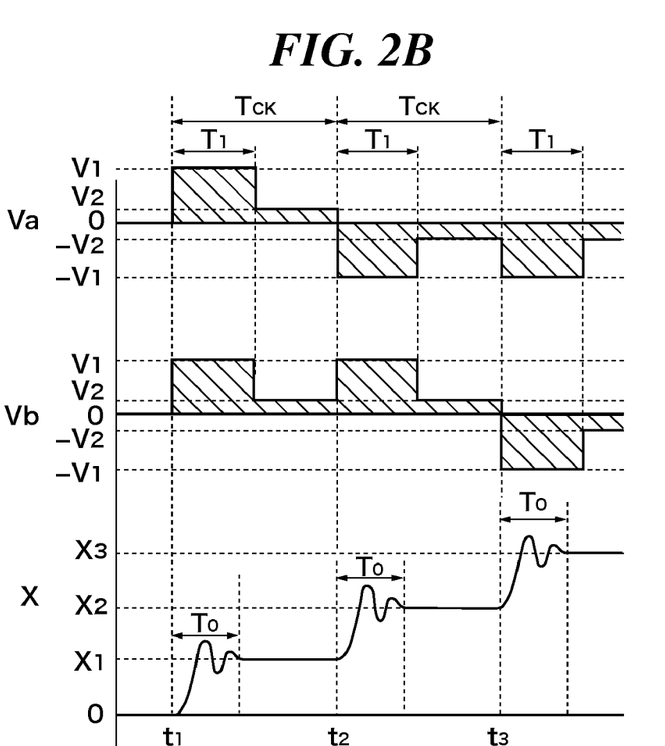

FIGS. 2A and 2B are diagrams useful in explaining methods of driving the stepping motors appearing in FIG. 1.

In the following, a description will be given of a case where one of the first stepping motor 2 and the second stepping motor 3 is driven, but the description can be applied to a case where the motors 2 and 3 are both driven.

Referring to FIGS. 2A and 2B, a driving method illustrated in FIG. 2A is referred to as a driving method A, and a driving method illustrated in FIG. 2B as a driving method B. The horizontal axis represents time, symbol V a voltage applied to a stepping motor (the first stepping motor 2 or the second stepping motor 3), and symbol X a lens position.

Further, symbol $T_{ck}$ represents a stepping motor drive pulse interval (pulse width), $T_0$ a time period required for recovery from an overshoot of lens displacement, and $T_1$ a time period over which a first applied voltage is applied in the driving method B. Symbol $t_1$ represents a time at which a first drive pulse is input, and $t_2$ a time at which a second drive pulse is input. Symbol $V_1$ represents the first applied voltage, $V_2$ a second applied voltage, $X_1$ a first lens position, and $X_2$ a second lens position.

When a drive pulse is input to a driver at time $t_1$, the driver switches the voltages applied to the phases of the stepping motor, whereby the stepping motor is rotated to displace the lens position from 0 to $X_1$. Then, when a drive pulse is input to the driver at time t2 after the lapse of the predetermined drive pulse interval $T_{ck}$, the driver switches the voltages applied to the phases of the stepping motor, whereby the stepping motor is rotated to displace the lens position from $X_1$ to $X_2$.

This operation is repeatedly carried out, whereby the shake correcting lens 1 is displaced to correct a shake. The value of the drive pulse interval $T_{ck}$ changes depending on the speed of a shake. When a shake with a higher speed is detected, the drive pulse interval $T_{ck}$ becomes shorter, whereas when a shake with a lower speed is detected, the drive pulse interval $T_{ck}$ becomes longer.

Next, a description will be given of the relationship between the driving methods and power consumption.

The driving method A is the same method as used in normal stepping motor driving in which the applied voltage is always held at the first applied voltage $V_1$. On the other hand, in the driving method B, the first applied voltage $V_1$ is applied over the time period $T_1$ after the start of the drive pulse interval (pulse width) $T_{ck}$, and then the first applied voltage $V_1$ is switched to the second applied voltage $V_2$ which is lower than the first applied voltage $V_1$.

In the driving method A, when motor resistance is represented by R, power consumption $J_A$ per one pulse can be expressed by the following equation:

$$J_A = T_{ck} \times V_1 \times V_1/R$$

On the other hand, power consumption $J_B$ per one pulse in the driving method B can be expressed by the following equation:

$$J_B = T_1 \times V_1 \times V_1/R + (T_{ck} - T_1) \times V_2 \times V_2/R$$

Assuming that $V_2$ is equal to one third of $V_1$ and $T_1$ is equal to one third of $T_{ck}$, $J_B$ is equal to approximately 41% of $J_A$, which means that the use of the driving method B makes it possible to significantly reduce power consumption.

Next, a description will be given of an optimum value of $T_1$ in the driving method B.

After the input of a drive pulse, an overshoot of lens displacement is caused due to the rotor inertia of the stepping motor or the inertia of the shake correcting lens 1. Symbol $T_0$ represents a time period from a time point a drive pulse is input, causing an overshoot of lens displacement, to a time point the shake correcting lens 1 becomes stable (recovers from the overshoot) at a certain displacement position.

If the time period $T_1$ is shorter than the time period $T_0$, which means that the applied voltage is switched to a lower one before the lens displacement recovers from an overshoot, the holding force of the stepping motor becomes insufficient, and hence the lens stop position becomes unstable, which causes degradation of shake correcting performance.

To eliminate this inconvenience, in the present embodiment, the time period $T_1$ is set to a predetermined value such that $T_1 > T_0$ holds. This makes it possible to reduce power consumption without degrading shake correcting performance.

Next, a description will be given of the relationship between the driving frequency of the stepping motor and the driving methods.

The driving frequency fm of the stepping motor can be expressed by $1/T_{ck}$. When the speed of a shake is high and the time period $T_{ck}$ is short, i.e. when the driving frequency fm of the stepping motor is high, the time period $T_1$ becomes longer than the time period $T_{ck}$ ($T_1 > T_{ck}$), and therefore it is impossible to drive the lens 1 by the driving method B.

On the other hand, when the speed of a shake is low and the time period $T_{ck}$ is long, i.e. when the driving frequency fm of the stepping motor is low, the time period $T_1$ becomes shorter than the time period $T_{ck}$ ($T_1 < T_{ck}$), and therefore it is possible to drive the lens by the driving method B In view of this, in the present embodiment, a predetermined frequency fa is set, and the CPU 6 is configured to drive the stepping motor by the driving method B when fm<fa holds, and to drive the same by the driving method A when fm>fa holds.

Assuming that the driving frequency fm of the stepping motor is f1 when $T_1 = T_{ck}$ holds, the frequency fa can be set freely within a range defined by the following expression:

$$0 < fa < f1$$

Thus, when the speed of a shake is low and the frequency fa is low, the driving method B is used, which enables reduction of power consumption.

Next, a description will be given of switching between the driving methods by the release switch 9.

A time period during which shake correction is required in still image shooting is roughly divided into an aiming time and an exposure time. The aiming time is a time period over which a photographer performs zooming and focusing while viewing through a viewfinder or a monitor, while the exposure time is a time period from a time point a release button is pressed to a time point an image of an object is actually formed on an image pickup surface.

In normal shooting, the aiming time is longer than the exposure time, and hence the problem is how to save electric power during the aiming time. Further, during the exposure time, it is required to carry out accurate shake correction so as to obtain an excellent image.

Therefore, according to the present embodiment, the present camera is configured such that the CPU 6 can determine from the state of the release switch 9 whether it is the aiming time or the exposure time, and switch the frequency fa based on the determination. In the present embodiment, fa is set to fa1 for the aiming time, and to fa2 for the exposure time, in a range defined by the following relationship:

$$0 < fa2 < fa1 < f1$$

Assuming that the frequency distribution of shakes is uniform, a time period over which the stepping motor is driven by the driving method B is longer in the aiming time than in the exposure time, and therefore it is possible to reduce power consumption by a larger amount than in the exposure time. Further, assuming that fa2 is equal to 0, the stepping motor is always driven by the driving method A during the exposure time, and the applied voltage never changes. Therefore, there is no longer any concern of degradation of stop accuracy or any degradation of shake correcting performance.

This makes it possible not only to reduce electric power consumed during the aiming time, but also to prevent degradation of shake correcting performance in the exposure time, to thereby obtain an excellent image without blur.

Figure 3:
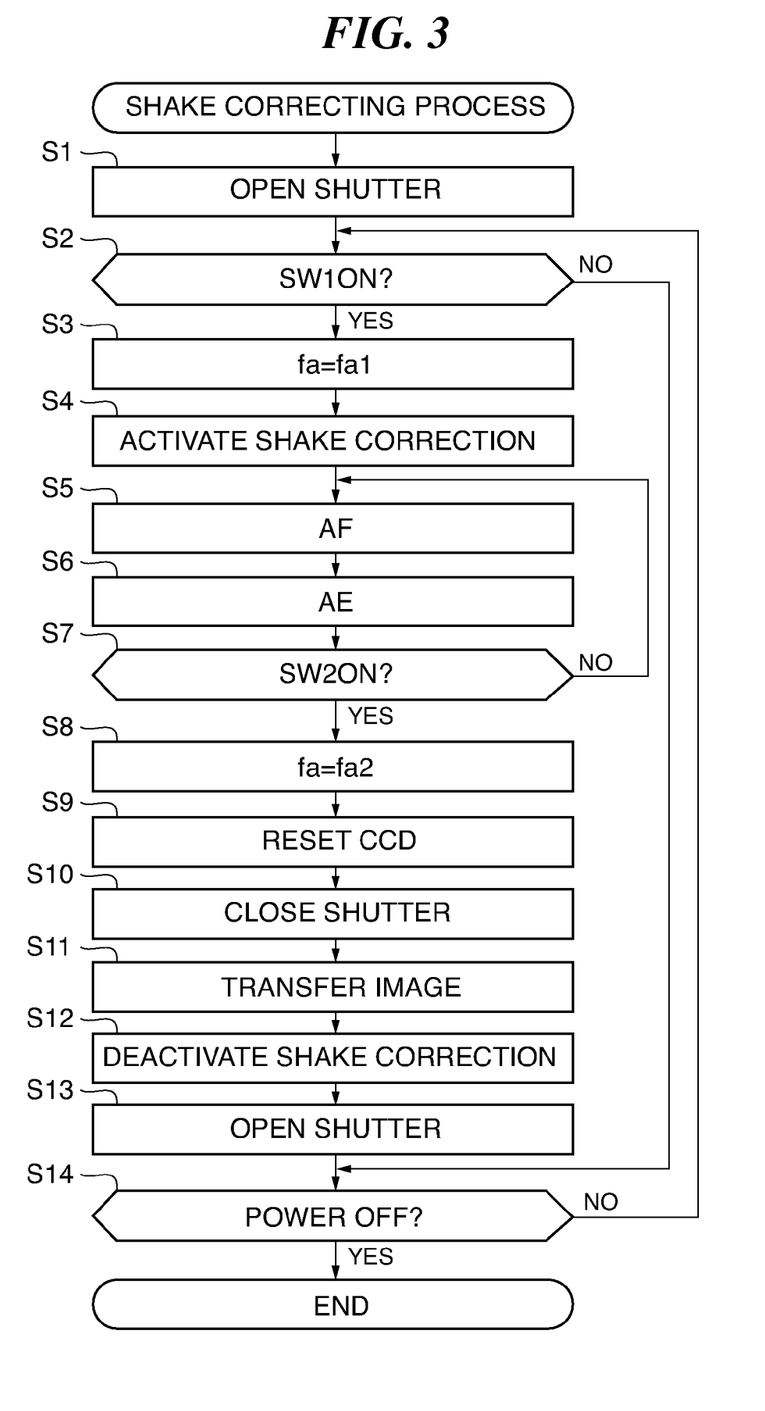
FIG. 3 is a flowchart of a shake correcting process executed by the camera in FIG. 1.

FIG. 3 is a flowchart of a shake correcting process executed by the camera in FIG. 1.

The present process is executed by the CPU 6 appearing in FIG. 1.

As shown in FIG. 3, first, when the power switch of the camera is turned on to turn on the power of the camera, a shutter opens (step S1), and monitoring of the release switch 9 and the power switch (steps S2 and S14) is started.

When the release switch 9 is set to a SW1ON position (YES to the step S2), the value of the frequency fa is set to fa1 (step S3), and shake correction is activated (step S4). In this state, the aiming-time shake correction is performed. Subsequently, while performing an autofocus operation (step S5) and an exposure setting operation (step S6), the release switch 9 is monitored for an operation of setting the same to a SW2ON position (step S7).

When the release switch 9 is switched to the SW2ON position (YES to the step S7), the value of the frequency fa is set to fa2 (step S8), and the exposure-time shake correction is started. Then, an image pickup element resetting operation (step S9), a shutter closing operation (step S10), and an image transfer operation (step S11) are carried out, followed by terminating the exposure operation.

When the exposure operation is completed, shake correction is deactivated (step S12). Then, the shutter opens (step S13), and the monitoring of the release switch 9 and the power switch (steps S2 and S14) is started again. When the power switch of the camera is turned off in this state (YES to the step S14), the present process is terminated.

Next, a description will be given of a driving method employed when the two stepping motors (the first stepping motor 2 and the second stepping motor 3) are driven simultaneously.

Figure 4:
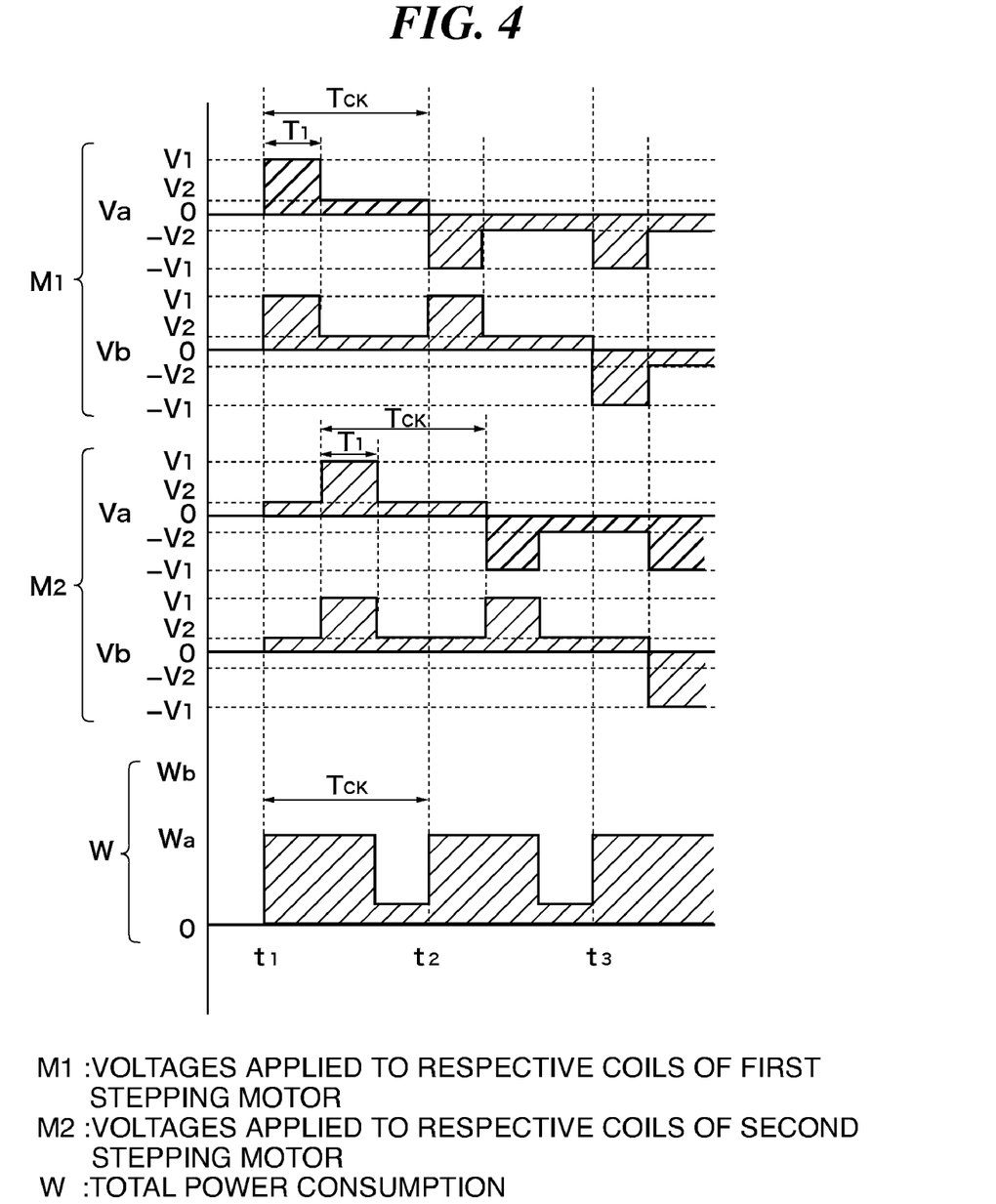
FIG. 4 is a diagram useful in explaining how voltages are applied when the two stepping motors appearing in FIG. 1 are driven simultaneously.

FIG. 4 is a diagram useful in explaining how voltages are applied in a case where the two stepping motors appearing in FIG. 1 are driven simultaneously.

In FIG. 4, M1 represents a voltage applied to the first stepping motor 2, M2 a voltage applied to the second stepping motor 3, and M1+M2 the total of the voltages.

Here, the two stepping motors are driven by the driving method B, so that it is possible to reduce power consumption by a larger amount than in a case where they are driven by the driving method A.

Further, according to the present embodiment, the drive pulses output from the CPU 6 are configured such that in the simultaneous driving of the two steppers, the applied voltage $V_1$ is not applied to the second stepping motor 3 while the applied voltage $V_1$ is being applied to the first stepping motor 2.

Similarly, the drive pulses output from the CPU 6 are configured such that the applied voltage $V_1$ is not applied to the first stepping motor 2 while the applied voltage $V_1$ is being applied to the second stepping motor 3.

In this case, when motor resistance is represented by R, a maximum power consumption Wb can be expressed by the following equation:

$$Wb=V_1 \times V_1/R + V_2 \times V_2/R$$

On the other hand, a maximum power consumption Wa in the case where the two stepping motors are driven by the driving method A can be expressed by the following equation:

$$Wa = 2 \times V_1 \times V_1/R$$

Assuming that $V_2$ is equal to one third of $V_1$, Wb is equal to approximately 56% of Wa. This means that the maximum power consumption can be significantly reduced.

Further, a drive pulse delay which occurs when this driving method is employed is $T_1$ at the maximum. This means that the present driving method makes it possible to make the pulse delay smaller than the driving methods disclosed in Japanese Laid-Open Patent Publications (Kokai) No. H10-197779 and No. H10-313593, in which the stepping motors are alternately driven.

In short, in the case where the two stepping motors are driven, it is possible to reduce not only the power consumption but also the maximum power consumption while suppressing degradation of shake correcting performance.

Next, a description will be given of a camera provided with a switch for switching between still image shooting and moving image shooting.

In the camera which is capable of switching between still image shooting and moving image shooting, a time period during which shake correction is required for one shooting operation is generally longer in moving image shooting, and hence the problem is how to save electric power in moving image shooting.

To solve this problem, the present camera is configured such that the CPU can determine, based on the state of the switch for switching between still image shooting and moving image shooting, whether it is during still image shooting or during moving image shooting and switch the frequency fa based on the determination. In the present embodiment, fa is set to fa1 for moving image shooting, and to fa2 for still image shooting in a range defined by the following relationship:

$$0 < fa2 < fa1 < f1$$

Assuming that the frequency distribution of shakes is uniform, a time period over which the stepping motor is driven by the driving method B is longer in moving image shooting than in still image shooting, and therefore it is possible to reduce power consumption in moving image shooting by a larger amount than in still image shooting.

Further, assuming that fa2 is equal to 0, the stepping motor is always driven by the driving method A in still image shooting, and the applied voltage never changes. Therefore, there is no longer any concern about degradation of stop accuracy or any degradation of shake correcting performance.

This makes it possible not only to reduce power consumption in moving image shooting, but also to obtain an excellent image without blur without degrading shake correcting performance in still image shooting.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-290067 filed Oct. 25, 2006, which is hereby incorporated by reference herein in its entirety.

What is claimed is:

1. A stepping motor driving device comprising:
   a stepping motor configured to drive a object; and
   a control unit configured to control the stepping motor by either one of a first driving method and a second driving method, the first driving method applying, to a stepping motor in each drive pulse interval, a first applied voltage over the drive pulse interval, the second driving method applying, to the stepping motor in each drive pulse interval, the first applied voltage over a first time period smaller than the drive pulse interval and then a second applied voltage smaller than the first applied voltage over the rest of the drive pulse interval, and the control unit switching between the first driving method and the second driving method depending on a state of a drive frequency of the stepping.

2. A stepping motor driving device according to claim 1, wherein the first time period is set be longer than the time period from a time point a drive pulse is input to a time point at which a shake correction of the lens becomes stable at a certain displacement position.

3. A lens driving device comprising:
   a lens which is movably supported;
   a stepping motor configured to drive the lens in a direction orthogonal to an optical axis; and
   a control unit configured to control the stepping motor by either one of a first driving method and a second driving method, the first driving method applying, to a stepping motor in each drive pulse interval, a first applied voltage over the drive pulse interval, the second driving method applying, to the stepping motor in each drive pulse interval, the first applied voltage over a first time period smaller than the drive pulse interval and then a second applied voltage smaller than the first applied voltage over the rest of the drive pulse interval, and the control unit switching between the first driving method and the second driving method depending on a state of a drive frequency of the stepping motor.

4. A lens driving device according to claim 3, wherein the first time period is set to be longer than the time period from a time point a drive pulse is input to a time point at which a shake correction of the lens becomes stable at a certain displacement position.

5. A camera comprising:
   a release switch;
   a lens which is movably supported;
   a stepping motor configured to drive the lens in a direction orthogonal to an optical axis; and
   a control unit configured to control the stepping motor by either one of a first driving method and a second driving method, the first driving method applying, to a stepping motor in each drive pulse interval, a first applied voltage over the drive pulse interval, the second driving method applying, to the stepping motor in each drive pulse interval, the first applied voltage over a first time period smaller than the drive pulse interval and then a second applied voltage smaller than the first applied voltage over the rest of the drive pulse interval, and the control unit switching between the first driving method and the second driving method depending on a state of the release switch.

6. A camera according to claim 5, wherein the first time period is set to be longer than the time period from a time point a drive pulse is input to a time point at which a shake correction of the lens becomes stable at a certain displacement position.

7. A camera comprising:
a switch having a function of switching between moving image shooting and still image shooting;
a lens which is movably supported;
a stepping motor configured to drive the lens in a direction orthogonal to an optical axis; and
a control unit configured to control the stepping motor by either one of a first driving method and a second driving method, the first driving method applying, to a stepping motor in each drive pulse interval, a first applied voltage over the drive pulse interval, the second driving method applying, to the stepping motor in each drive pulse interval, the first applied voltage over a first time period smaller than the drive pulse interval and then a second applied voltage smaller than the first applied voltage over the rest of the drive pulse interval, and the control unit switch between the first driving method and the second driving method depending on a state of the said switch.

8. A camera according to claim 7, wherein the first time period is set to be longer than the time period from a time point a drive pulse is input to a time point at which a shake correction of the lens becomes stable at a certain displacement position.

* * * * *